US011765554B2

(12) United States Patent
Yavuz et al.

(10) Patent No.: US 11,765,554 B2
(45) Date of Patent: Sep. 19, 2023

(54) SC-MCCH SEGMENT SCHEDULING FOR FEMTC AND ENB-IOT

(71) Applicant: Telefonaktiebolaget LM Ericsson (publ), Stockholm (SE)

(72) Inventors: Emre Yavuz, Stockholm (SE); Johan Bergman, Stockholm (SE); Karin Hedén, Sundbyberg (SE); Antti Ratilainen, Espoo (FI); Yutao Sui, Solna (SE); Stefan Wånstedt, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 843 days.

(21) Appl. No.: 16/477,822

(22) PCT Filed: Dec. 19, 2017

(86) PCT No.: PCT/IB2017/058151
§ 371 (c)(1),
(2) Date: Jul. 12, 2019

(87) PCT Pub. No.: WO2018/134661
PCT Pub. Date: Jul. 26, 2018

(65) Prior Publication Data
US 2020/0128363 A1    Apr. 23, 2020

Related U.S. Application Data

(60) Provisional application No. 62/449,294, filed on Jan. 23, 2017.

(51) Int. Cl.
*H04W 4/06* (2009.01)
*H04W 4/70* (2018.01)
(Continued)

(52) U.S. Cl.
CPC ............. *H04W 4/06* (2013.01); *H04L 1/0003* (2013.01); *H04L 5/0053* (2013.01); *H04W 4/70* (2018.02); *H04W 72/23* (2023.01); *H04W 72/30* (2023.01)

(58) Field of Classification Search
CPC .... H04L 12/189; H04W 72/005; H04W 4/06; H04W 72/042
(Continued)

(56) References Cited

U.S. PATENT DOCUMENTS 10,972,877 B2 *  4/2021  Fujishiro ................ H04W 4/80
2010/0165901 A1    7/2010  Kim
(Continued)

FOREIGN PATENT DOCUMENTS

CN    105992158 A    10/2016
CN    105992376 A    10/2016
(Continued)

OTHER PUBLICATIONS

3GPP TSG-RAN WG2 Meeting #96; Reno, USA; Source: ETSI MCC; Object: Skeleton report—Nov. 14-18, 2016.
(Continued)

*Primary Examiner* — Christopher M Crutchfield
*Assistant Examiner* — Jean F Voltaire
(74) *Attorney, Agent, or Firm* — BAKER BOTTS L.L.P.

(57) ABSTRACT

Systems and methods relating to scheduling and transmitting/receiving a segmented Single-Cell Multicast Control Channel (SC-MCCH) are disclosed. In some embodiments, a method of operation of a wireless device to receive a plurality of SC-MCCH segments comprises obtaining information regarding segmentation of a SC-MCCH into a plurality of SC-MCCH segments and receiving, from a network node, separate transmissions for the plurality of SC-MCCH segments in accordance with the information regarding
(Continued)

segmentation of the SC-MCCH. By segmenting the SC-MCCH in this manner, increasing the maximum Transport Block Size (TBS) or defining a higher TBS size for SC-MCCH can be avoided.

18 Claims, 7 Drawing Sheets

(51) Int. Cl.
*H04L 1/00* (2006.01)
*H04L 5/00* (2006.01)
*H04W 72/23* (2023.01)
*H04W 72/30* (2023.01)

(58) Field of Classification Search
USPC .......................................................... 370/329
See application file for complete search history.

(56) References Cited

U.S. PATENT DOCUMENTS

| | | | |
|---|---|---|---|
| 2017/0265166 A1* | 9/2017 | Hosseini | H04W 8/186 |
| 2018/0014246 A1* | 1/2018 | Chang | H04W 4/06 |
| 2018/0145839 A1* | 5/2018 | Lee | H04W 4/06 |

FOREIGN PATENT DOCUMENTS

| | | |
|---|---|---|
| CN | 106332294 A | 1/2017 |
| EP | 1884042 A1 | 2/2008 |
| WO | 2008100115 A1 | 8/2008 |
| WO | 2016018293 A1 | 2/2016 |
| WO | 2016031105 A1 | 3/2016 |

OTHER PUBLICATIONS

Change Request, "SC-PTM: Introduction of Test Model", 3GPP TSG- RAN WG5 Meeting #73, Reno, USA, Nov. 14-18, 2016, pp. 1-4, R5-168098, 3GPP.

Huawei et al., "Discussion on SC-PTM configuration in NB-IoT", 3GPP TSG-RAN WG2 Meeting #95bis, Kaohsiung, Taiwan, Oct. 10-14, 2016, pp. 1-3, R2-166322, 3GPP.

Intel Corporation, "Multicast RAN2 impacts for FeMTC and eNB-IoT", 3GPP TSG-RAN WG2 Meeting #95bis, Kaohsiung, Taiwan, Oct. 10-14, 2016, pp. 1-5, R2-166685, 3GPP.

Chinese Office Action issued for Application No. 201780084365. 9—dated Jan. 26, 2022.

3GPP TS 36.321 v13.1.0; Technical Specification; 3rd Generation Partnership Project; Technical Specification Group Radio Access Network; Evolved Universal Terrestrial Radio Access (E-UTRA); Medium Access Control (MAC) protocol specification (Release 13)—Mar. 2016.

3GPP TS 36.331 v13.1.0; Technical Specification; 3rd Generation Partnership Project; Technical Specification group radio access Network; Evolved Universal Terrestrial Radio Access (E-UTRA); Radio Resource Control (RRC) Protocol specification (Release 13)—Mar. 2016.

3GPP TSG-RAN WG1 Meeting #84: St. Julian's, Malta; Source: WI rapporteur (Ericsson); Title: RAN1 agreements for Rel-13 NB-IoT (R1-161548) Feb. 15-19, 2016.

3GPP TSG-RAN WG2 Meeting #95bis; Kaohsiung, Taiwan; Source: Mediatek Inc. (Session Chair); Title: DRAFT Report from the IoT breakout sessions (R2-16xxxx)—Oct. 10-14, 2016.

3GPP TSG-RAN WG2 Meeting #96; Reno, USA; Source: ZTE; Title: SC-MCCH Transmission and Configuration (R2-167688)—Nov. 14-18, 2016.

3GPP TSG-RAN WG2 Meeting #96; Reno, Nevada, USA; Source: Huawei, HiSilicon; Title: Discussion on SC-MCCH related issues in FeMTC (R2-167825)—Nov. 14-18, 2016.

3GPP TSG-RAN1 #84: St. Julian's, Malta; Source: Ericsson; Title: NB-IoT—NB-PBCH design (R1-160259)—Feb. 15-19, 2016.

3GPP TSG-RAN WG2 #96; Reno, Nevada; Source: Ericsson; Title: Number of SC-MTCHs supported by SC-MCCH (Tdoc R2-168800)—Nov. 14-18, 2018.

PCT International Search Report for International application No. PCT/IB2017/058151—Mar. 14, 2018.

PCT Written Opinion of the International Searching Authority for International application No. PCT/IB2017/058151—Mar. 14, 2018.

3GPP TSG RAN WG1 Meeting #86bis; Lisbon, Portugal; Source: Huawei, HiSilicon; Title: Discussion on configuration of SC-MTCH in NB-IoT (R1-1608612)—dated Oct. 10-14, 2016.

\* cited by examiner

SC-MCCH SEGMENT SCHEDULING FOR FEMTC AND ENB-IOT

RELATED APPLICATIONS

This application claims the benefit of provisional patent application Ser. No. 62/449,294, filed Jan. 23, 2017, the disclosure of which is hereby incorporated herein by reference in its entirety.

PRIORITY

This nonprovisional application is a U.S. National Stage Filing under 35 U.S.C. § 371 of International Patent Application Serial No. PCT/IB2017/058151 filed Dec. 19, 2017 and entitled "SC-MCCH Segment Scheduling for FeMTC and eNB-IoT" which claims priority to U.S. Provisional Patent. Application No. 62/449,294 filed Jan. 23, 2017 both of which are hereby incorporated by reference in their entirety.

TECHNICAL FIELD

The present disclosure relates generally to wireless communications, and more specifically to segment scheduling of a Single-Cell Multicast Control Channel (SC-MCCH).

BACKGROUND

There has been a significant amount of work in the Third Generation Partnership Project (3GPP) lately on specifying technologies to cover Machine-to-Machine (M2M) and/or Internet of Things (IoT) related use cases. Recent work for 3GPP Release (Rel) 13 includes enhancements to support Machine Type Communications (MTC) with a new User Equipment (UE) category M1 (Cat-M1) supporting reduced maximum bandwidth of up to six Physical Resource Blocks (PRBs) and a Narrowband IoT (NB-IoT) work item specifying a new radio interface and UE category NB1 (Cat-NB1).

In this document, the Long Term Evolution (LTE) enhancements introduced in 3GPP Rel-13 for MTC are referred to as "eMTC" or "enhanced MTC," and the further enhancements introduced in 3GPP Rel-14 are referred to as "FeMTC" or "further enhanced MTC" including but not limited to support for bandwidth limited UEs, Cat-M1, Cat-M2, and support for coverage enhancements. This is to separate discussion from NB-IoT, although the supported features have certain similarities on a general level.

There are multiple differences between "legacy" LTE and the procedures and channels defined for eMTC or FeMTC work. The same is true for NB-IoT. Some important differences include a new physical downlink control channel called MTC Physical Downlink Control Channel (MPDCCH) used in eMTC, and a new physical downlink control channel called Narrowband Physical Downlink Control Channel (NPDCCH) used in NB-IoT.

In the LTE specifications, multicast and broadcast services have been specified under Multimedia Broadcast Multicast Services (MBMS), enabling transmission of the same content to multiple UEs in a specified area at the same time.

Neither Cat-M1 nor NB-IoT UEs (i.e., Cat-NB1 UEs) currently support MBMS (i.e., neither Cat-M1 nor NB-IoT UEs support MBMS in Rel-13). However, in 3GPP Rel-14, the multicast service is being standardized for both eMTC/ FeMTC and NB-IoT UEs. This is because, for many IoT use cases, multicast support would be an important feature to have. Example use cases could include, without limitation, transmission of a firmware update to a large number of sensors or other devices or sending a command to a large number of actuators at the same time. Currently, such transmissions/commands would need to be transmitted to each receiving UE separately using unicast transmissions. However, using multicast to transmit the same transmission/ command to a large number of UEs with a single transmission would reduce the time needed to deliver the message and the radio resources required, thus increasing spectral efficiency. The multicast services can be realized using at least two different transmissions schemes, MBMS Single-Frequency Network (MBSFN) and Single-Cell Point-to-Multipoint (SC-PTM).

In SC-PTM, part of the configuration and control information is sent over a Single-Cell Multicast Control Channel (SC-MCCH) logical channel. UEs are not expected to monitor this channel continuously, but an indication of change to this information is indicated using a Single-Cell Notification Radio Network Temporary Identifier (SC-N-RNTI), which UEs are expected to monitor.

The SC-MCCH is a logical channel defined in the Medium Access Control (MAC) specification, found in 3GPP Technical Specification (TS) 36.321. The SC-MCCH is transmitted over a Downlink Shared Channel (DL-SCH) transport channel, which in turn is transmitted using the Physical Downlink Control Channel (PDCCH) and Physical Downlink Shared Data Channel (PDSCH), both being physical channels in legacy LTE. For eMTC, the corresponding physical control channel is a MPDCCH and for NB-IoT the corresponding physical channels would be NPDCCH and Narrowband Physical Downlink Shared Channel (NPDSCH).

The SC-MCCH carries the SCPTMConfiguration Radio Resource Control (RRC) message (see 3GPP TS 36.331), which includes configuration information for the UEs to receive MBMS service(s) using Single-Cell Multicast Traffic Channel (SC-MTCH) logical channel(s).

For MBSFN, part of the configuration and control information is sent over the Multicast Control Channel (MCCH). Changes are indicated using the MBMS Radio Network Temporary Identifier (M-RNTI) in this case.

The work item for NB-IoT was approved at the 3GPP RAN #70 meeting. The objective of this work item is to specify a radio access for cellular IoT that addresses improved indoor coverage, provides support for a massive number of low throughput devices, is not sensitive to delay, has ultra-low device cost, has low device power consumption, and provides (optimized) network architecture.

For NB-IoT, three different operation modes are defined, i.e., stand-alone, guard-band, and in-band. In stand-alone mode, the NB-IoT system is operated in dedicated frequency bands. For in-band operation, the NB-IoT system can be placed inside the frequency bands used by the current LTE system, while in the guard-band mode, the NB-IoT system can be operated in the guard band used by the current (legacy) LTE system. NB-IoT can operate with a system bandwidth of 180 kilohertz (kHz). When multiple carriers are configured, several 180 kHz carriers can be used, e.g., for increasing the system capacity, inter-cell interference coordination, load balancing, etc.

In order to adapt to certain use cases that require more capacity than usual, e.g., software or firmware upgrade, multi-carrier operations are used. The NB-IoT device listens to the system information on the anchor carrier, but when there is data, the communication can be moved to a secondary carrier.

Due to the limitation of maximum Transport Block Size (TBS), it is not possible to convey all the payload of SC-MCCH in one TBS if several SC-MTCHs need to be configured at the same time. Therefore, it has been agreed that the payload of SC-MCCH needs to be segmented. For eMTC/FeMTC, a maximum of 128 simultaneous SC-MTCHs can be configured in one cell, and for NB-IoT, a maximum of 64 simultaneous SC-MTCHs can be configured in one cell. However, it is not clear how the SC-MCCH segments are scheduled and sent to the UEs.

SC-MCCH uses a modification period and repetition period concepts, which means there is a time limit and a repetition period (should be equal to or smaller than modification period), within which the SC-MCCH should be transmitted. The SC-MCCH is repeated every repetition period. When SC-MCCH is changed, the changed SC-MCCH is transmitted initially in the beginning of the following modification period. The configurable values of the modification period in Rel-13 are {rf2, rf4, rf8, rf16, rf32, rf64, rf128, rf256, rf512, rf1024, r2048, rf4096, rf8192, rf16384, rf32768, rf65536} and the repetition period is {rf2, rf4, rf8, rf16, rf32, rf64, rf128, rf256} with 'rf' referring to radio frames. With the coverage enhancements methods of NB-IoT and eMTC, i.e. repetitions, staying within these periods could be challenging, and therefore it has been decided to extend them for Rel-14. However, the exact values for extensions have not been agreed upon.

In the current SC-PTM for legacy LTE transmission, the maximum TBS is large enough that segmentation of the SC-MCCH payload is not needed. But with NB-IoT and eMTC, the TBS is reduced compared to legacy LTE. As such, the size of the SC-MCCH message may exceed this reduced TBS, especially when there are multiple SC-MTCHs configured by that SC-MCCH. Therefore, segmentation is needed to segment SC-MCCH to fit in the smaller TBSs. However, there is no existing solution for how to transmit and/or schedule SC-MCCH segments when the SC-MCCH payload is segmented since segmentation of the SC-MCCH payload is not possible in legacy LTE. For this reason, the scheduling mechanisms of the segments of one SC-MCCH message need to be solved. With the use of coverage enhancements, i.e. repetitions, receiving the segments takes additional time, which adds some additional challenge for receiving all the segments within a repetition period of SC-MCCH, even with the possible extensions to the current legacy values for the repetition and modification periods.

SUMMARY

Systems and methods relating to scheduling and transmitting/receiving a segmented Single-Cell Multicast Control Channel (SC-MCCH) are disclosed. In some embodiments, a method of operation of a wireless device to receive a plurality of SC-MCCH segments comprises obtaining information regarding segmentation of a SC-MCCH into a plurality of SC-MCCH segments and receiving, from a network node, separate transmissions for the plurality of SC-MCCH segments in accordance with the information regarding segmentation of the SC-MCCH. By segmenting the SC-MCCH in this manner, increasing the maximum Transport Block Size (TBS) or defining a higher TBS size for SC-MCCH can be avoided.

In some embodiments, obtaining the information regarding segmentation of the SC-MCCH into the plurality of SC-MCCH segments comprises receiving separate Downlink Control Information (DCI) messages scheduling the separate transmissions for the plurality of SC-MCCH segments. Further, in some embodiments, receiving the separate transmissions for the plurality of SC-MCCH segments in accordance with the information regarding segmentation of the SC-MCCH comprises receiving the separate transmissions for the plurality of SC-MCCH segments in accordance with the separate DCI messages scheduling the separate transmissions for the plurality of SC-MCCH segments. In some embodiments, for each SC-MCCH segment, the separate DCI message scheduling the separate transmission for the SC-MCCH segment comprises an indication of a Modulation and Coding Scheme (MCS) and repetition number for the separate transmission for the SC-MCCH segment. In some embodiments, for each SC-MCCH segment, the separate DCI message scheduling the separate transmission for the SC-MCCH segment comprises an indication as to whether there is a subsequent SC-MCCH segment scheduled and at what time interval a next SC-MCCH segment is scheduled. In some embodiments, configuration of the separate DCI messages scheduling the separate transmissions for the plurality of SC-MCCH segments is configured in system information. In some embodiments, configuration of the separate DCI messages scheduling the separate transmissions for the plurality of SC-MCCH segments is derived by the wireless device. In some embodiments, two or more types of DCI messages are configured, wherein the two or more types of DCI messages comprise a first type of DCI message for non-segmented SC-MCCH scheduling and a second type for segmented SC-MCCH scheduling, wherein the separate DCI messages scheduling the separate transmissions for the plurality of SC-MCCH segments are of the second type.

In some embodiments, receiving the separate DCI messages scheduling the separate transmissions for the plurality of SC-MCCH segments comprises receiving a first DCI message that schedules a transmission for a first SC-MCCH segment of the plurality of SC-MCCH segments and receiving a second DCI message that schedules a transmission for a second SC-MCCH segment of the plurality of SC-MCCH segments. In some embodiments, receiving the separate transmissions for the plurality of SC-MCCH segments in accordance with the information regarding segmentation of the SC-MCCH comprises receiving the transmission for the first SC-MCCH segment in accordance with the first DCI message and receiving the transmission for the second SC-MCCH segment in accordance with the second DCI message.

In some embodiments, obtaining the information regarding segmentation of the SC-MCCH into the plurality of SC-MCCH segments comprises receiving a single DCI message scheduling all of the separate transmissions for the plurality of SC-MCCH segments. In some embodiments, receiving the separate transmissions for the plurality of SC-MCCH segments in accordance with the information regarding segmentation of the SC-MCCH comprises receiving the separate transmissions for the plurality of SC-MCCH segments in accordance with the single DCI message scheduling all of the separate transmissions for the plurality of SC-MCCH segments. In some embodiments, the single DCI message comprises information that indicates how many SC-MCCH segments are in the plurality of SC-MCCH segments scheduled by the single DCI message. In some embodiments, the single DCI message comprises an indication of a common MCS and repetition number for the separate transmissions for the plurality of SC-MCCH segments. In some embodiments, a spacing between the separate transmissions for the plurality of SC-MCCH segments is signaled to the wireless device. In some embodiments, a spacing between the separate transmissions for the plurality of SC-MCCH segments is assumed to be such that the separate transmissions for the plurality of SC-MCCH segments are assumed to be transmitted one right after the other. In some embodiments, a spacing between the separate transmissions for the plurality of SC-MCCH segments is assumed to be such that the separate transmissions for the plurality of SC-MCCH segments are assumed to be transmitted with a fixed interval between each other.

In some embodiments, obtaining the information regarding segmentation of the SC-MCCH into the plurality of SC-MCCH segments comprises receiving a DCI message scheduling a transmission for a first SC-MCCH segment of the plurality of SC-MCCH segments, wherein information regarding segmentation of the SC-MCCH into the plurality of SC-MCCH segments further comprises information regarding transmissions for one or more subsequent SC-MCCH segments of the plurality of SC-MCCH segments that is otherwise informed to the wireless device. In some embodiments, receiving the separate transmissions for the plurality of SC-MCCH segments in accordance with the information regarding segmentation of the SC-MCCH comprises receiving the transmission for the first SC-MCCH segment in accordance with the DCI message scheduling the transmission for the first SC-MCCH segment and receiving the transmissions for the one or more subsequent SC-MCCH segments in accordance with the information regarding the transmissions for the one or more subsequent SC-MCCH segments of the plurality of SC-MCCH segments that is otherwise informed to the wireless device. In some embodiments, the information regarding transmissions for one or more subsequent SC-MCCH segments of the plurality of SC-MCCH segments that is otherwise informed to the wireless device comprises an indication added at the end of each of the plurality of SC-MCCH segments that indicates whether there is a another SC-MCCH segment to be transmitted. In some embodiments, the information regarding transmissions for one or more subsequent SC-MCCH segments of the plurality of SC-MCCH segments that is otherwise informed to the wireless device comprises information included in system information.

In some embodiments, a combined size of the plurality of SC-MCCH segments is greater than a maximum TBS for the wireless device.

In some embodiments, the wireless device is an enhanced Machine Type Communication (eMTC)/further enhanced Machine Type Communication (FeMTC) User Equipment (UE) or a Narrowband Internet of Things (NB-IoT) UE.

Embodiments of a wireless device for receiving a plurality of SC-MCCH segments are disclosed. In some embodiments, a wireless device for receiving a plurality of SC-MCCH segments is adapted to obtain information regarding segmentation of a SC-MCCH into a plurality of SC-MCCH segments and receive, from a network node, separate transmissions for the plurality of SC-MCCH segments in accordance with the information regarding segmentation of the SC-MCCH.

In some embodiments, a wireless device for receiving a plurality of SC-MCCH segments comprises an interface configured to transmit to and receive from a network node in a wireless communication system and a processor operable to obtain information regarding segmentation of a SC-MCCH into a plurality of SC-MCCH segments and receive, from the network node via the interface, separate transmissions for the plurality of SC-MCCH segments in accordance with the information regarding segmentation of the SC-MCCH.

In some embodiments, a wireless device for receiving a plurality of SC-MCCH segments comprises an obtaining module operable to obtain information regarding segmentation of a SC-MCCH into a plurality of SC-MCCH segments and a receiving module operable to receive, from a network node, separate transmissions for the plurality of SC-MCCH segments in accordance with the information regarding segmentation of the SC-MCCH.

Embodiments of a method of operation of a network node to schedule and transmit a plurality of SC-MCCH segments are also disclosed. In some embodiments, a method of operation of a network node to schedule and transmit a plurality of SC-MCCH segments comprises providing, to one or more wireless devices, information regarding segmentation of a SC-MCCH into a plurality of SC-MCCH segments and transmitting, to the one or more wireless devices, separate transmissions for the plurality of SC-MCCH segments in accordance with the information regarding segmentation of the SC-MCCH.

In some embodiments, providing the information regarding segmentation of the SC-MCCH into the plurality of SC-MCCH segments comprises providing separate DCI messages scheduling the separate transmissions for the plurality of SC-MCCH segments. In some embodiments, transmitting the separate transmissions for the plurality of SC-MCCH segments in accordance with the information regarding segmentation of the SC-MCCH comprises transmitting the separate transmissions for the plurality of SC-MCCH segments in accordance with the separate DCI messages scheduling the separate transmissions for the plurality of SC-MCCH segments. In some embodiments, for each SC-MCCH segment, the separate DCI message scheduling the separate transmission for the SC-MCCH segment comprises an indication of a MCS and repetition number for the separate transmission for the SC-MCCH segment. In some embodiments, for each SC-MCCH segment, the separate DCI message scheduling the separate transmission for the SC-MCCH segment comprises an indication as to whether there is a subsequent SC-MCCH segment scheduled and at what time interval a next SC-MCCH segment is scheduled. In some embodiments, configuration of the separate DCI messages scheduling the separate transmissions for the plurality of SC-MCCH segments is configured in system information. In some embodiments, configuration of the separate DCI messages scheduling the separate transmissions for the plurality of SC-MCCH segments is derived by the wireless device. In some embodiments, two or more types of DCI messages are configured, wherein the two or more types of DCI messages comprise a first type of DCI message for non-segmented SC-MCCH scheduling and a second type for segmented SC-MCCH scheduling, wherein the separate DCI messages scheduling the separate transmissions for the plurality of SC-MCCH segments are of the second type.

In some embodiments, providing the separate DCI messages scheduling the separate transmissions for the plurality of SC-MCCH segments comprises providing a first DCI message that schedules a transmission for a first SC-MCCH segment of the plurality of SC-MCCH segments and providing a second DCI message that schedules a transmission for a second SC-MCCH segment of the plurality of SC-MCCH segments. In some embodiments, transmitting the separate transmissions for the plurality of SC-MCCH segments in accordance with the information regarding segmentation of the SC-MCCH comprises transmitting the transmission for the first SC-MCCH segment in accordance with the first DCI message and transmitting the transmission for the second SC-MCCH segment in accordance with the second DCI message.

In some embodiments, providing the information regarding segmentation of the SC-MCCH into the plurality of SC-MCCH segments comprises providing a single DCI message scheduling all of the separate transmissions for the plurality of SC-MCCH segments. In some embodiments, transmitting the separate transmissions for the plurality of SC-MCCH segments in accordance with the information regarding segmentation of the SC-MCCH comprises transmitting the separate transmissions for the plurality of SC-MCCH segments in accordance with the single DCI message scheduling all of the separate transmissions for the plurality of SC-MCCH segments. In some embodiments, the single DCI message comprises information that indicates how many SC-MCCH segments are in the plurality of SC-MCCH segments scheduled by the single DCI message. In some embodiments, the single DCI message comprises an indication of a common MCS and repetition number for the separate transmissions for the plurality of SC-MCCH segments. In some embodiments, a spacing between the separate transmissions for the plurality of SC-MCCH segments is signaled to the wireless device. In some embodiments, a spacing between the separate transmissions for the plurality of SC-MCCH segments is such that the separate transmissions for the plurality of SC-MCCH segments can be assumed, by the one or more wireless devices, to be transmitted one right after the other. In some embodiments, a spacing between the separate transmissions for the plurality of SC-MCCH segments is such that the separate transmissions for the plurality of SC-MCCH segments can be assumed, by the one or more wireless devices, to be transmitted with a fixed interval between each other.

In some embodiments, providing the information regarding segmentation of the SC-MCCH into the plurality of SC-MCCH segments comprises providing a DCI message scheduling a transmission for a first SC-MCCH segment of the plurality of SC-MCCH segments, wherein information regarding segmentation of the SC-MCCH into the plurality of SC-MCCH segments further comprises information regarding transmissions for one or more subsequent SC-MCCH segments of the plurality of SC-MCCH segments that is otherwise informed to the wireless device.

In some embodiments, transmitting the separate transmissions for the plurality of SC-MCCH segments in accordance with the information regarding segmentation of the SC-MCCH comprises transmitting the transmission for the first SC-MCCH segment in accordance with the DCI message scheduling the transmission for the first SC-MCCH segment and transmitting the transmissions for the one or more subsequent SC-MCCH segments in accordance with the information regarding the transmissions for the one or more subsequent SC-MCCH segments of the plurality of SC-MCCH segments that is otherwise informed to the wireless device. In some embodiments, the information regarding transmissions for one or more subsequent SC-MCCH segments of the plurality of SC-MCCH segments that is otherwise informed to the wireless device comprises an indication added at the end of each of the plurality of SC-MCCH segments that indicates whether there is a another SC-MCCH segment to be transmitted. In some embodiments, the information regarding transmissions for one or more subsequent SC-MCCH segments of the plurality of SC-MCCH segments that is otherwise informed to the wireless device comprises information included in system information.

In some embodiments, a combined size of the plurality of SC-MCCH segments is greater than a maximum TBS for the wireless device.

In some embodiments, the one or more wireless devices comprise an eMTC/FeMTC UE and/or a NB-IoT UE.

Embodiments of a network node for scheduling and transmitting a plurality of SC-MCCH segments are also disclosed. In some embodiments, a network node for scheduling and transmitting a plurality of SC-MCCH segments is adapted to provide, to one or more wireless devices, information regarding segmentation of a SC-MCCH into a plurality of SC-MCCH segments and transmit, to the one or more wireless devices, separate transmissions for the plurality of SC-MCCH segments in accordance with the information regarding segmentation of the SC-MCCH.

In some embodiments, a network node for scheduling and transmitting a plurality of SC-MCCH segments comprises an interface configured to transmit to and receive from one or more wireless devices in a wireless communication system and a processor operable to provide, to the one or more wireless devices, information regarding segmentation of a SC-MCCH into a plurality of SC-MCCH segments and transmit, to the one or more wireless devices via the interface, separate transmissions for the plurality of SC-MCCH segments in accordance with the information regarding segmentation of the SC-MCCH.

In some embodiments, a network node for scheduling and transmitting a plurality of SC-MCCH segments comprises a providing module operable to provide, to one or more wireless devices, information regarding segmentation of a SC-MCCH into a plurality of SC-MCCH segments and a transmitting module operable to transmit, to the one or more wireless devices, separate transmissions for the plurality of SC-MCCH segments in accordance with the information regarding segmentation of the SC-MCCH.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
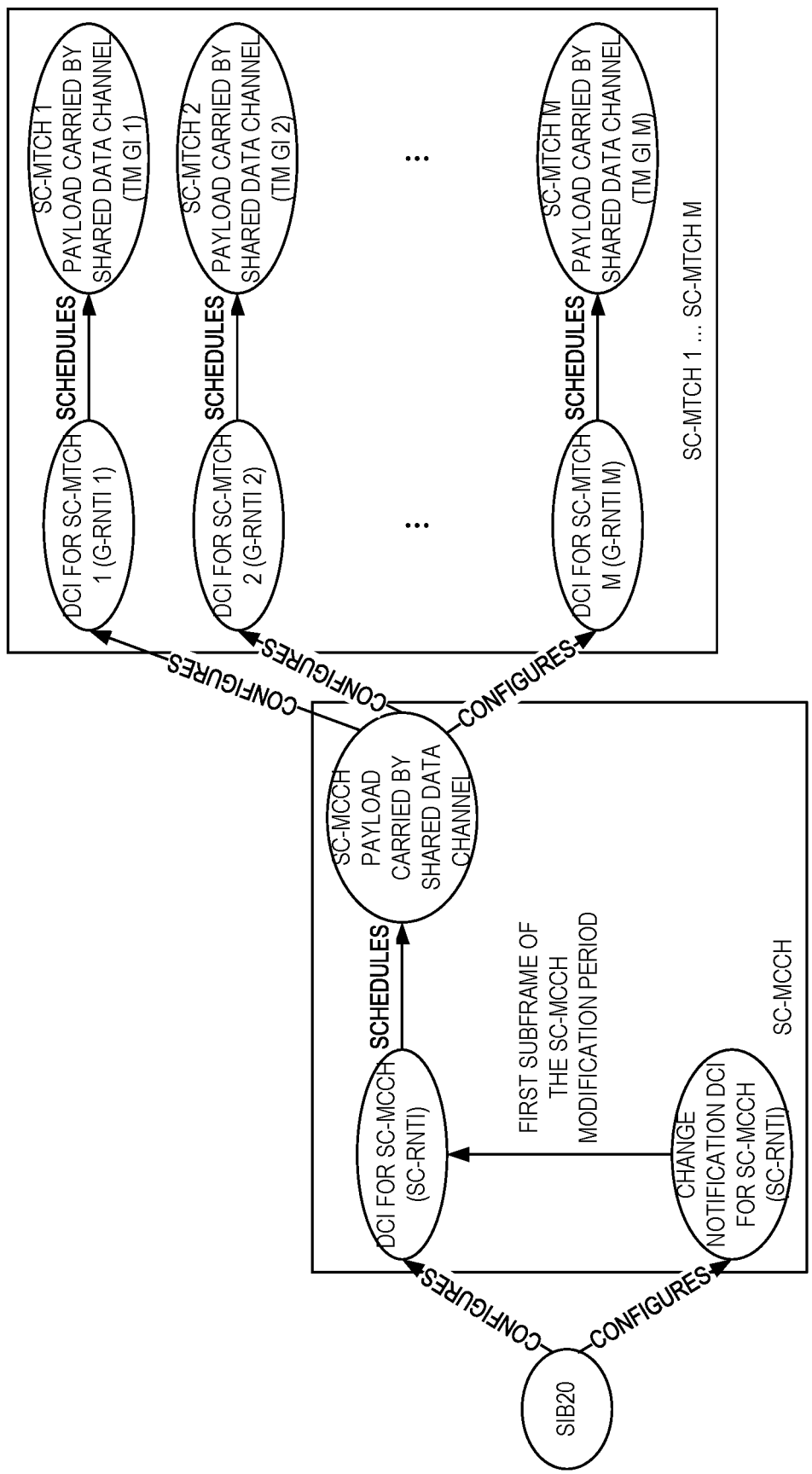
FIG. 1 shows the legacy Long Term Evolution (LTE) Release (Rel) 13 (Rel-13) Single-Cell Point-to-Multipoint (SC-PTM) work procedures.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

In the current Single-Cell Point-to-Multipoint (SC-PTM) for legacy Long Term Evolution (LTE) transmission, the maximum Transport Block Size (TBS) is large enough that segmentation of the Single-Cell Multicast Control Channel (SC-MCCH) payload is not needed. But with Narrowband Internet of Things (NB-IoT) and enhanced Machine Type Communication (eMTC), the TBS is reduced compared to legacy LTE. As such, the size of the SC-MCCH message may exceed this reduced TBS, especially when there are multiple Single-Cell Multicast Traffic Channels (SC-MTCHs) configured by that SC-MCCH. Therefore, segmentation is needed to segment SC-MCCH to fit in the smaller TBSs. However, there is no existing solution for how to transmit and/or schedule SC-MCCH segments when the SC-MCCH payload is segmented since segmentation of the SC-MCCH payload is not possible in legacy LTE. For this reason, the scheduling mechanisms of the segments of one SC-MCCH message need to be solved. With the use of coverage enhancements, i.e. repetitions, receiving the segments takes additional time, which adds some additional challenge for receiving all the segments within a repetition period of SC-MCCH, even with the possible extensions to the current legacy values for the repetition and modification periods.

In order to address these issues and shortcomings, various embodiments are disclosed herein. The proposed solutions provide necessary scheduling information to make sure the eMTC/further enhanced Machine Type Communication (FeMTC) or NB-IoT User Equipments (UEs) are aware of the SC-MCCH segmentation. Hence, the UE can receive all the segments of the SC-MCCH. Various aspects of these solutions may be embodied in network nodes (e.g., enhanced or evolved Node B (eNB)), UEs, or any other suitable wireless device.

A method performed by a network node is disclosed. The method comprises transmitting the segments of a segmented SC-MCCH message to one or more UEs. The method further comprises providing information regarding the segmentation to the one or more UEs. According to certain embodiments, a single Downlink Control Information (DCI) schedules all of the transmitted segments. Furthermore, the single DCI may contain the information regarding the segmentation, including at least a total number of the segments. According to alternative embodiments, a single DCI schedules only a first transmitted segment. The network node informs the one or more UEs of the remaining scheduled segments using different mechanisms than DCI. According to alternative embodiments, a separate DCI schedules each respective segment.

A network node is also disclosed. The network node comprises processing circuitry configured to transmit the segments of a segmented SC-MCCH message to one or more UEs. The processing circuitry is further configured to provide information regarding the segmentation to the one or more UEs. According to certain embodiments, a single DCI schedules all of the transmitted segments. Furthermore, the single DCI may contain the information regarding the segmentation, including at least a total number of the segments. According to alternative embodiments, a single DCI schedules only a first transmitted segment. The network node informs the one or more UEs of the remaining scheduled segments using different mechanisms than DCI. According to alternative embodiments, a separate DCI schedules each respective segment.

A method performed by a UE is also disclosed. The method comprises receiving segments of a segmented SC-MCCH message from a network node. The method further comprises determining information regarding the segmentation. According to certain embodiments, the UE receives the segments via a single DCI that schedules all of the transmitted segments. Furthermore, the single DCI may contain the information regarding the segmentation, including at least a total number of the segments. According to alternative embodiments, the UE may receive a first transmitted segment, which is scheduled by a single DCI. The UE then receives the remaining scheduled segments using different mechanisms than DCI. According to alternative embodiments, the UE receives each segment via a separate respective DCI.

A UE is also disclosed. The UE comprises processing circuitry configured to receive segments of a segmented SC-MCCH message from a network node. The processing circuitry is further configured to determine information regarding the segmentation. According to certain embodiments, the UE receives the segments via a single DCI that schedules all of the transmitted segments. Furthermore, the single DCI may contain the information regarding the segmentation, including at least a total number of the segments. According to alternative embodiments, the UE may receive a first transmitted segment, which is scheduled by a single DCI. The UE then receives the remaining scheduled segments using different mechanisms than DCI. According to alternative embodiments, the UE receives each segment via a separate respective DCI.

These and other embodiments will be described in more detail below.

Certain embodiments of the present disclosure may provide one or more technical advantages. For instance, with the proposed solution there is no need to increase the maximum TBS or define new TBS of the SC-MCCH. According to certain embodiments, the resources on Machine Type Communication (MTC) Physical Downlink Control Channel (MPDCCH) (used by eMTC/FeMTC) or Narrowband Physical Downlink Control Channel (NPDCCH) (used by NB-IoT) are conserved. Other advantages may be readily available to one having skill in the art. Certain embodiments may have none, some, or all of the recited advantages.

As mentioned above, SC-PTM has two important channels, i.e., SC-MCCH and SC-MTCH. FIG. 1 shows the legacy LTE Release (Rel) 13 SC-PTM work procedures. From FIG. 1, it can be seen that, in a cell, there is only one SC-MCCH that configures several SC-MTCHs, which offer different multicast services. The payload of SC-MCCH and SC-MTCH are carried by a shared data channel, and scheduled using DCI. Currently, for eMTC, a DCI (which is also referred to herein as a "DCI message") is carried by MPDCCH; and, for NB-IoT, a DCI (which is also referred to herein as a "DCI message") is carried by NPDCCH.

Currently, the DCI format used for eMTC and NB-IoT SC-PTM has not been decided in Third Generation Partnership Project (3GPP).

The maximum TBS that can be used for SC-MCCH payload is 1000 bits for eMTC and 680 bits for NB-IoT. It is agreed that for eMTC/FeMTC and NB-IoT, there is one SC-MCCH per cell, which supports 64 simultaneous SC-MTCHs for NB-IoT and 128 simultaneous SC-MTCHs for eMTC. Based on this, there may be more bits needed than the current maximum TBS supported for SC-MCCH payload, particularly if several simultaneous SC-MTCHs need to be configured in a cell. In those situations, the payload of SC-MCCH payload would need to be segmented. If the SC-MCCH payload is segmented, this information needs to be made available at the UEs that are interested in SC-PTM service in order for these UEs to receive the SC-MCCH correctly.

In this disclosure, several different solutions are proposed to transmit the segmented SC-MCCH to the UEs and make the segmentation information/configuration available at the UE. Similarly, several different solutions are proposed to receive the segmented SC-MCCH messages at the UEs and determine the segmentation information/configuration. These solutions are typified by FIGS. 2 and 3, respectively.

Figure 2:
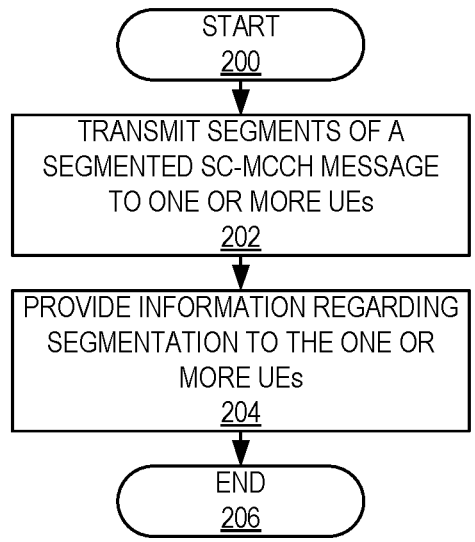
FIG. 2 is a flowchart illustrating a sample method performed by a network node in accordance with at least some embodiments of the present disclosure.

FIG. 2 is a flowchart illustrating a sample method performed by a network node. After starting the method (step 200), the network node transmits segments of a segmented SC-MCCH message to one or more UEs (step 202). At step 204, the network node provides information regarding the segmentation to the one or more UEs. The method then ends (step 206). Although these steps are illustrated as separate steps, it will be understood that they could be combined or performed at the same time.

Figure 3:
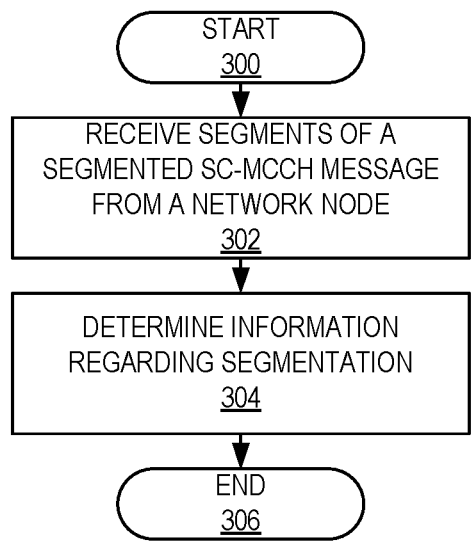
FIG. 3 is a flowchart illustrating a sample method performed by a wireless device in accordance with some embodiments of the present disclosure.

FIG. 3 is a flowchart illustrating a sample method performed by a UE. After starting the method (step 300), the UE receives segments of a segmented SC-MCCH message from a network node (step 302). At step 304, the UE determines information regarding the segmentation. The method then ends (step 306). Although these steps are illustrated as separate steps, it will be understood that they could be combined or performed at the same time.

The various embodiments and additional details of the methods of FIG. 2 and FIG. 3 will be disclosed in more detail below. Although these are listed as different "Solutions" below, it will be appreciated that various aspects of the different solutions may be combined or omitted, as appropriate, without diverging from the scope of the present disclosure. The various solutions are illustrated as follows.

Solution 1

According to certain embodiments, just a single DCI (i.e., a single DCI message) is used, which may schedule all segments. With this option, the time that the UE spends listening to DCI scheduling SC-MCCH is much smaller. This may be especially true when the SC-MCCH payload is segmented into multiple segments. Note that these segments are referred to herein interchangeably as "segments" or "SC-MCCH segments." As will be understood by one of skill in the art, a single SC-MCCH (i.e., a single SC-MCCH payload) is segmented into multiple SC-MCCH segments. When combined, the multiple SC-MCCH segments form the SC-MCCH (i.e., form the SC-MCCH payload). Further, segmenting a SC-MCCH is also referred to herein as segmenting a SC-MCCH payload. In addition, the resources on MPDCCH (used by eMTC/FeMTC) or NPDCCH (used by NB-IoT) are conserved. When only one DCI schedules all segments, it must contain information on at least about how many segments there are in total. In other words, when the single DCI is used to schedule multiple SC-MCCH segments, the DCI includes information that indicates how many SC-MCCH segments there are in total. It is desirable to keep the DCI small. According to certain embodiments, this can be accomplished if the segments have a common Modulation and Coding Scheme (MCS) and repetition number. Otherwise, a MCS and repetition number for every segment would need to be included in the DCI, which would greatly increase the size of the DCI. Also, the spacing between the segments could be signaled to the UE explicitly or semi-statically, or the spacing between the segments can be assumed, by the UE, to be such that the segments are transmitted one right after the other. Alternatively, the segments are transmitted with a fixed interval between each other. The fixed interval can be either configured semi-statically in the system information, the DCI, or simply hard coded in the specification.

Figure 4:
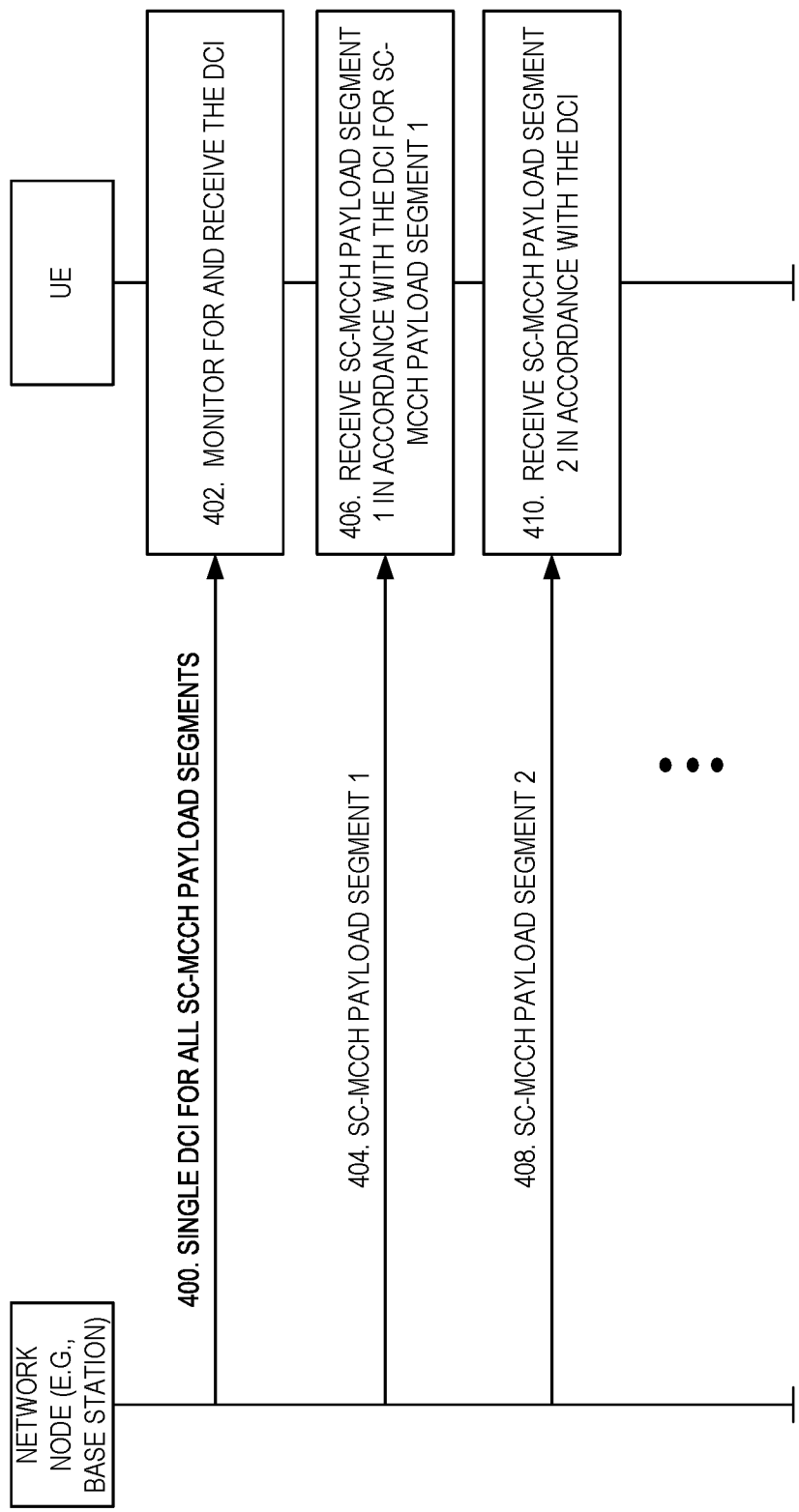
FIG. 4 illustrates the operation of a network node and a wireless device in accordance with first embodiments of the present disclosure.

FIG. 4 illustrates the operation of a network node (e.g., a base station) and a UE in accordance with at least some aspects of Solution 1 described above. As illustrated, the network node sends a single DCI (i.e., a single DCI message) to the UE for all SC-MCCH segments (step 400). This DCI schedules all of the SC-MCCH segments. As discussed above, the DCI includes information that indicates the total number of SC-MCCH segments. As also discussed above, the DCI may include additional information such as, e.g., information regarding the spacing between the SC-MCCH segments, a common MCS and repetition number for all SC-MCCH segments, or a separate MCS and repetition number for each SC-MCCH segment. The UE monitors for and receives the DCI (step 402).

The network node transmits a first SC-MCCH segment of the segments scheduled by the DCI in step 400 (step 404), and the UE receives the first SC-MCCH segment in accordance with the DCI (step 406). In the same manner, the network node transmits a second SC-MCCH segment of the segments scheduled by the DCI in step 400 (step 408), and the UE receives the second SC-MCCH segment in accordance with the DCI (step 410). The process continues in this manner for the remaining SC-MCCH segments scheduled by the DCI in step 400.

Solution 2

According to certain embodiments, one DCI (i.e., one DCI message) schedules only the first segment, while the subsequent segments are informed to the UE with some other mechanism. These mechanisms could include, but are not limited to, the following:

According to certain embodiments, adding an indication at the end of each segment to signal that there is another related segment coming. This would have minimal impact on the current DCI structure. The DCI scheduling the first segment informs about the MCS and repetition number of the first segment. Since every segment of one SC-MCCH transmission is meant to be received by the same UE(s), the UE may assume that the MCS and repetition number should be the same for each subsequent segment. Upon reception of each segment, there could be some indication in the end of the segment to let the UEs know if there is another segment of the same SC-MCCH transmission coming. The time interval(s) between the segments could be signaled with this indication or could be predetermined, e.g. the segments are right next to each other or there is a fixed interval between each of the segments. The fixed interval can be either configured semi-statically in the system information, in the DCI, or simply hard coded in the specification. Another option is to use in-band signaling such as a Medium Access Control (MAC) control element for this indication.

According to certain embodiments, the UE could be informed of subsequent segments using the system information. The number of segments could be indicated and the time interval(s) between the segments could be explicitly signaled with this indication or predetermined, e.g. the segments are right next to each other or there is a fixed interval between each of the segments. The fixed interval can be either configured semi-statically in the system information, in the DCI, or simply hard coded in the specification. Another option is to use in-band signaling such as a MAC control element for this indication.

Figure 5:
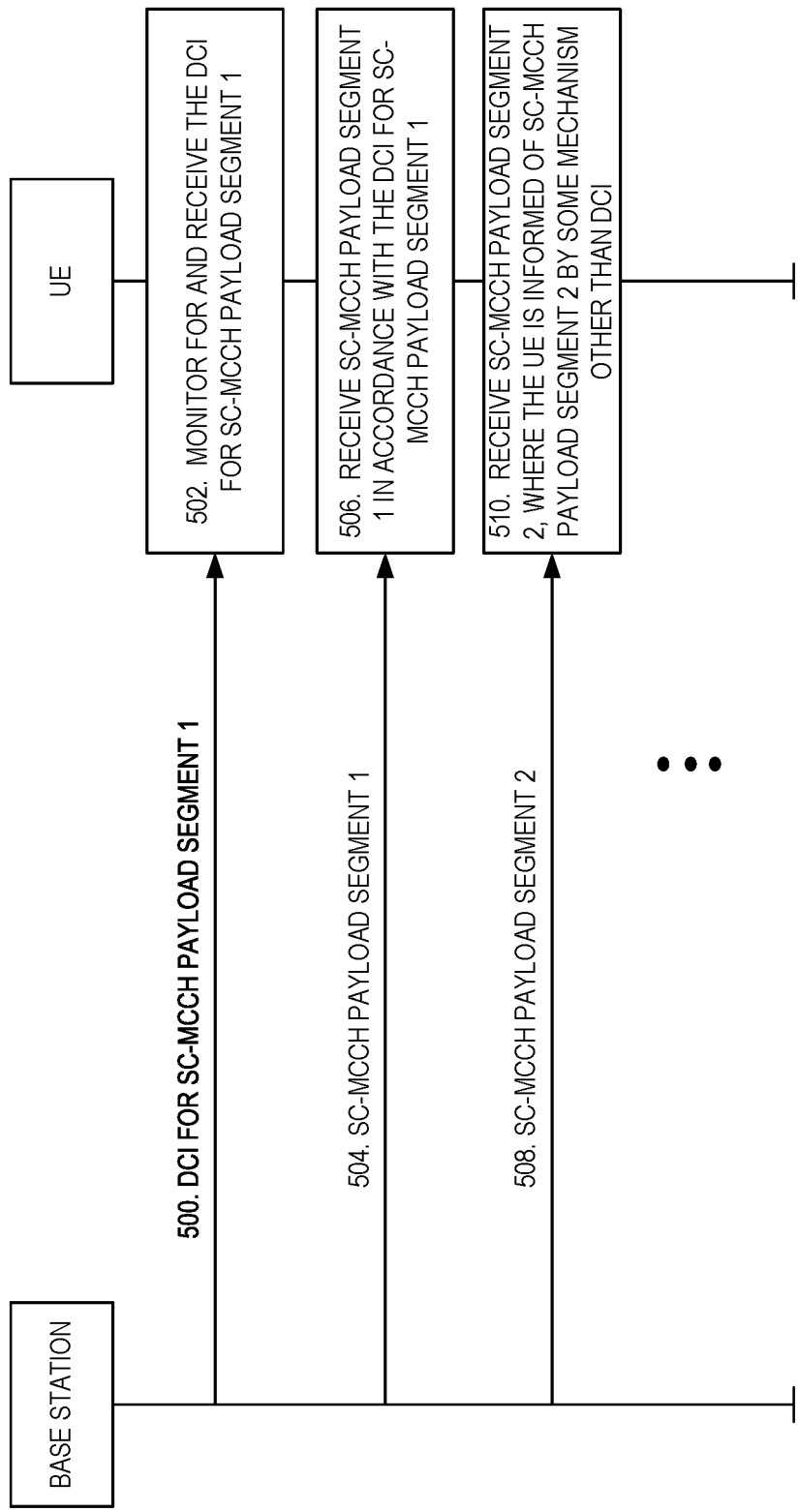
FIG. 5 illustrates the operation of a network node and a wireless device in accordance with second embodiments of the present disclosure.

FIG. 5 illustrates the operation of a network node (e.g., a base station) and a UE in accordance with at least some aspects of Solution 2 described above. As illustrated, the network node sends a DCI (i.e., a DCI message) to the UE for a first SC-MCCH segment (step 500). This DCI schedules only the first SC-MCCH segment. The UE monitors for and receives the DCI (step 502). The network node transmits the first SC-MCCH segment scheduled by the DCI in step 500 (step 504), and the UE receives the first SC-MCCH segment in accordance with the DCI (step 506). The network node transmits a second SC-MCCH segment (step 508), and the UE receives the second SC-MCCH segment, where the UE is informed of the second SC-MCCH segment by some mechanism other than DCI, as described above (step 510). The process continues in this manner for any remaining SC-MCCH segments.

Solution 3

According to certain embodiments, a separate DCI may be used for scheduling each of the segments. In other words, separate DCI messages are used for scheduling the separate SC-MCCH segments. With this option, each transmission of an SC-MCCH segment is separately scheduled with a DCI. This option gives more flexibility since the segments are scheduled independently and, therefore, the segments are not required to be transmitted right after each other. Also, this allows the different segments to have different MCSs and repetition numbers.

In each of the DCIs, the DCI may also indicate whether there is a subsequent segment scheduled and at what time interval the next segment is scheduled.

The configuration of the DCIs, e.g., search space configurations, of different SC-MCCH segments can be configured in the system information. Alternatively, the configuration of the DCIs can be implicitly derived by a UE based on the number of segments of the SC-MCCH.

Also, in the system information, two or more types of DCIs can be configured, where one DCI type is for non-segmented SC-MCCH scheduling and another DCI type is for segmented SC-MCCH scheduling. The configurations (e.g., size of the DCI, MCS, search space, number of repetitions) can be different for different types of DCIs.

This is new in SC-MCCH, as in the legacy system the maximum TBS is large enough that one DCI is enough to schedule the SC-MCCH.

Figure 6:
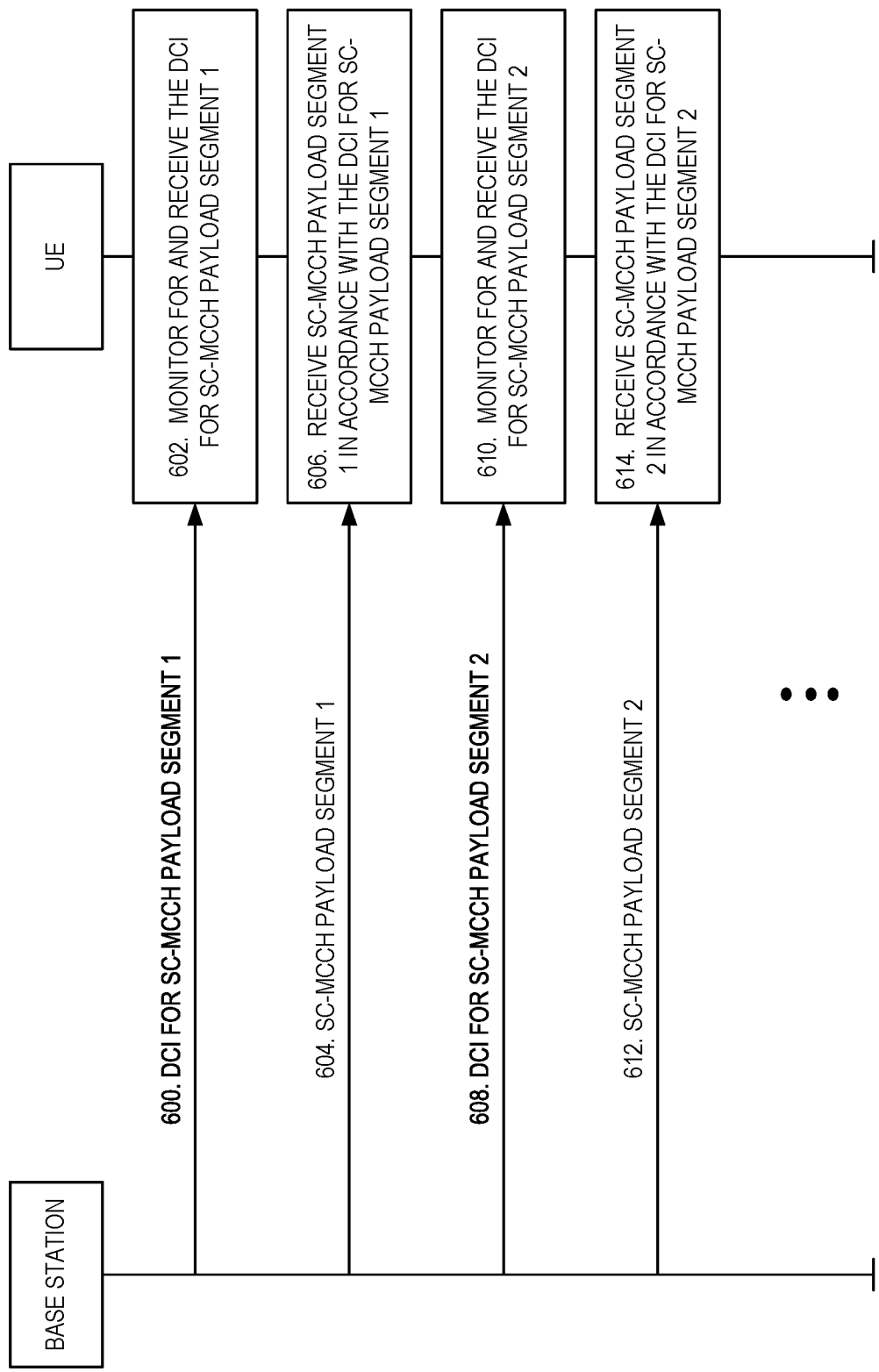
FIG. 6 illustrates the operation of a network node and a wireless device in accordance with third embodiments of the present disclosure.

FIG. 6 illustrates the operation of a network node (e.g., a base station) and a UE in accordance with at least some aspects of Solution 3 described above. As illustrated, the network node sends a DCI (i.e., a DCI message) to the UE for a first SC-MCCH segment (step 600). This DCI schedules the first SC-MCCH segment. The UE monitors for and receives the DCI (step 602). The network node transmits the first SC-MCCH segment scheduled by the DCI in step 600 (step 604), and the UE receives the first SC-MCCH segment in accordance with the DCI (step 606). The network node sends a DCI (i.e., a DCI message) to the UE for a second SC-MCCH segment (step 608). This DCI schedules the second SC-MCCH segment. The UE monitors for and receives the DCI for the second SC-MCCH segment (step 610). The network node transmits the second SC-MCCH segment scheduled by the DCI in step 608 (step 612), and the UE receives the second SC-MCCH segment in accordance with the DCI (step 614). The process continues in this manner for any remaining SC-MCCH segments.

The various embodiments of the proposed solution, as described above, include both network and UE aspects. The network and UEs contemplated herein will now be described more fully hereinafter with reference to the accompanying drawings. Other embodiments, however, are contained within the scope of this disclosure and the present disclosure should not be construed as limited to only the embodiments set forth herein; rather, these embodiments are provided by way of example to convey the scope of the inventive concept to those skilled in the art. Like numbers refer to like elements throughout the description.

Figure 7:
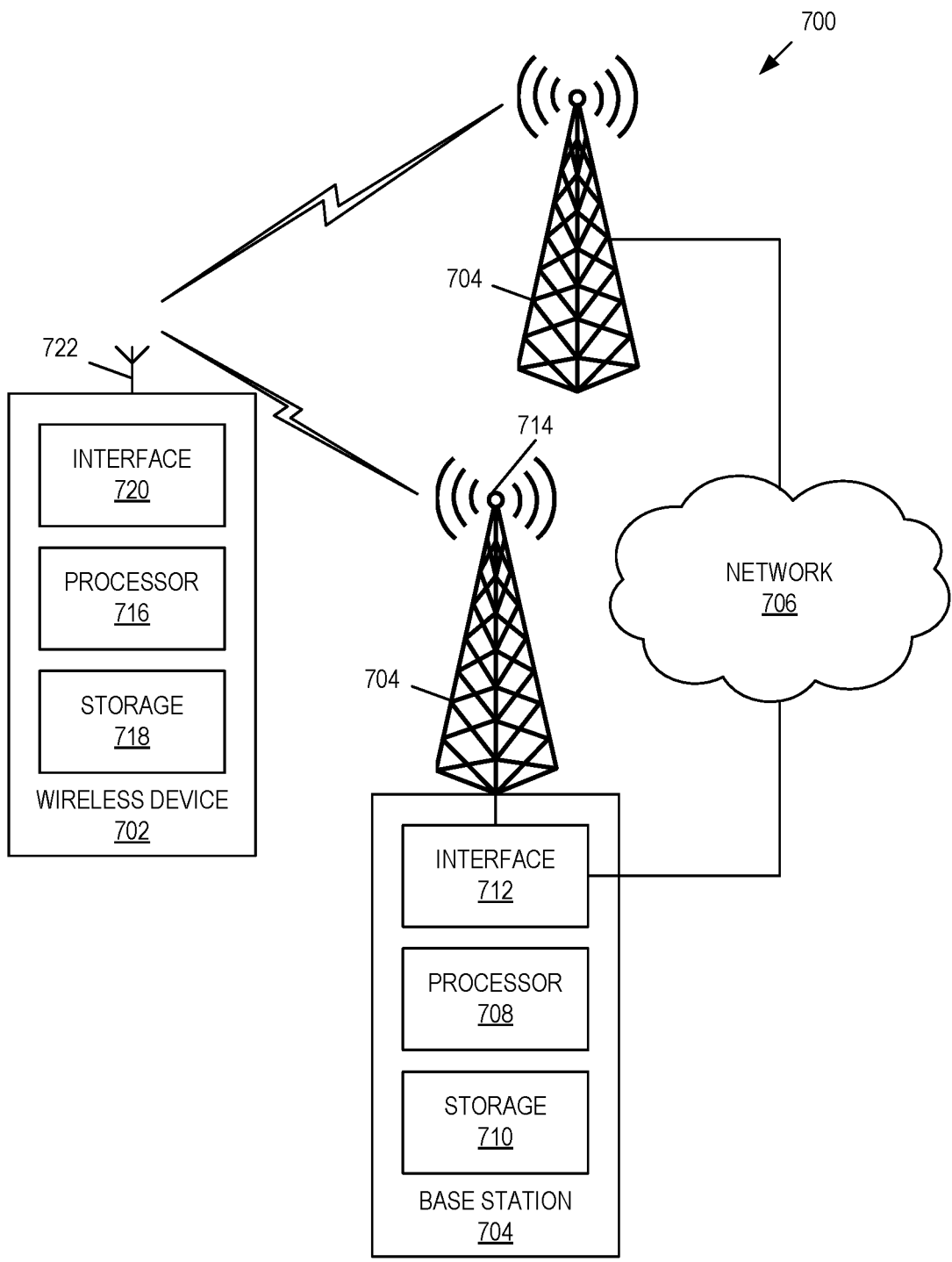
FIG. 7 illustrates one example of a wireless communication network in which embodiments of the present disclosure may be implemented.

Although the solutions described above may be implemented in any appropriate type of system using any suitable components, particular embodiments of the described solutions may be implemented in a wireless network such as the example wireless communication network illustrated in FIG. 7. In the example embodiment of FIG. 7, a wireless communication network 700 provides communication and other types of services to one or more wireless devices 702 (also referred to herein as UEs or user equipments). In the illustrated embodiment, the wireless communication network 700 includes one or more instances of network nodes, which in the illustrated example are base stations 704 (which are also referred to herein as network nodes 704), that facilitate the wireless devices' 702 access to and/or use of the services provided by the wireless communication network 700. The wireless communication network 700 may further include any additional elements suitable to support communication between wireless devices 702 or between a wireless device 702 and another communication device, such as a landline telephone.

A network 706 may comprise one or more Internet Protocol (IP) networks, Public Switched Telephone Networks (PSTNs), packet data networks, optical networks, Wide Area Networks (WANs), Local Area Networks (LANs), Wireless Local Area Networks (WLANs), wired networks, wireless networks, metropolitan area networks, and other networks to enable communication between devices.

The wireless communication network 700 may represent any type of communication, telecommunication, data, cellular, and/or radio network or other type of system. In particular embodiments, the wireless communication network 700 may be configured to operate according to specific standards or other types of predefined rules or procedures. Particular embodiments of the wireless communication network 700 may implement any communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; WLAN standards, such as the IEEE 802.11 standards; and/or any other appropriate wireless communication standard, such as the Worldwide Interoperability for Microwave Access (WiMax), Bluetooth, and/or ZigBee standards.

FIG. 7 comprises a more detailed view of the network node 704 and the wireless device 702, in accordance with a particular embodiment. For simplicity, FIG. 7 only depicts the network 706, the network nodes 704, and the wireless device 702. In the illustrated example, the network node 704 is a base station 704 and comprises a processor 708, storage 710, an interface 712, and an antenna 714. Similarly, the wireless device 702 comprises a processor 716, storage 718, an interface 720, and an antenna 722. These components may work together in order to provide network node and/or wireless device functionality, such as providing wireless connections in a wireless communication network. In different embodiments, the wireless communication network 700 may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged, and/or operable to communicate directly or indirectly with a wireless device and/or with other equipment in the wireless communication network that enable and/or provide wireless access to the wireless device. Examples of network nodes include, but are not limited to, access points, in particular radio access points. A network node may represent base stations, such as radio base stations. Particular examples of radio base stations include Node Bs, New Radio (NR) base stations (gNBs), and eNBs. Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base stations may also be referred to as nodes in a Distributed Antenna System (DAS).

As a particular non-limiting example, a base station may be a relay node or a relay donor node controlling a relay.

Yet further examples of network nodes include Multi-Standard Radio (MSR) radio equipment such as MSR base stations, network controllers such as Radio Network Controllers (RNCs) or Base Station Controllers (BSCs), Base Transceiver Stations (BTSs), transmission points, transmission nodes, Multi-cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 7, the network node 704 comprises the processor 708, the storage 710, the interface 712, and the antenna(s) 714. The processor 708, the storage 710, and the interface 712 are depicted as single boxes located within a single larger box. In practice however, a network node may comprise multiple different physical components that make up a single illustrated component (e.g., the interface 712 may comprise terminals for coupling wires for a wired connection and a radio transceiver for a wireless connection). As another example, the network node 704 may be a virtual network node in which multiple different physically separate components interact to provide the functionality of the network node 704 (e.g., the processor 708 may comprise three separate processors located in three separate enclosures, where each processor is responsible for a different function for a particular instance of the network node 704). Similarly, the network node 704 may be composed of multiple physically separate components (e.g., a Node B component and a RNC component, a BTS component and a BSC component, etc.), which may each have their own respective processor, storage, and interface components. In certain scenarios in which the network node 704 comprises multiple separate components (e.g., BTS and BSC components), one or more of the separate components may be shared among several network nodes. For example, a single RNC may control multiple Node Bs. In such a scenario, each unique Node B and BSC pair may be a separate network node. In some embodiments, the network node 704 may be configured to support multiple Radio Access Technologies (RATs). In such embodiments, some components may be duplicated (e.g., separate storage 710 for the different RATs) and some components may be reused (e.g., the same antenna 714 may be shared by the RATs).

The processor 708 may be a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software and/or encoded logic operable to provide, either alone or in conjunction with other network node 704 components, such as the storage 710, network node 704 functionality. For example, the processor 708 may execute instructions stored in the storage 710. Such functionality may include providing various wireless features discussed herein to wireless devices, such as the wireless device 702, including any of the features or benefits disclosed herein.

The storage 710 may comprise any form of volatile or non-volatile computer readable memory including, without limitation, persistent storage, solid state memory, remotely mounted memory, magnetic media, optical media, Random Access Memory (RAM), Read Only Memory (ROM), removable media, or any other suitable local or remote memory component. The storage 710 may store any suitable instructions, data, or information, including software and encoded logic, utilized by the network node 704. The storage 710 may be used to store any calculations made by the processor 708 and/or any data received via the interface 712.

The network node 704 also comprises the interface 712 which may be used in the wired or wireless communication of signaling and/or data between the network node 704, the network 706, and/or the wireless device 702. For example, the interface 712 may perform any formatting, coding, or translating that may be needed to allow the network node 704 to send and receive data from the network 706 over a wired connection. The interface 712 may also include a radio transmitter and/or a receiver that may be coupled to or a part of the antenna 714. The radio may receive digital data that is to be sent out to other network nodes or wireless devices via a wireless connection. The radio may convert the digital data into a radio signal having the appropriate channel and bandwidth parameters. The radio signal may then be transmitted via the antenna 714 to the appropriate recipient (e.g., the wireless device 702).

The antenna 714 may be any type of antenna capable of transmitting and receiving data and/or signals wirelessly. In some embodiments, the antenna 714 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" refers to a device capable, configured, arranged, and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, UEs such as smart phones. Further examples include wireless cameras, wireless-enabled tablet computers, Laptop Embedded Equipment (LEE), Laptop Mounted Equipment (LME), Universal Serial Bus (USB) dongles, and/or wireless Customer Premise Equipment (CPE).

As one specific example, a wireless device may represent a UE configured for communication in accordance with one or more communication standards promulgated by the 3GPP, such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support Device-to-Device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a Machine-to-Machine (M2M) device, which may in a 3GPP context be referred to as a MTC device. As one particular example, the wireless device may be a UE implementing the 3GPP NB-IoT standard. Particular examples of such machines or devices are sensors, metering devices such as power meters, industrial machinery, or home or personal appliances, e.g. refrigerators, televisions, personal wearables such as watches, etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 7, the wireless device 702 may be any type of wireless endpoint, mobile station, mobile phone, wireless local loop phone, smartphone, UE, desktop computer, Personal Digital Assistant (PDA), cell phone, tablet, laptop, or Voice over IP (VoIP) phone or handset, which is able to wirelessly send and receive data and/or signals to and from a network node, such as the network node 704 and/or other wireless devices. The wireless device 702 comprises the processor 716, the storage 718, the interface 720, and the antenna 722. Like the network node 704, the components of the wireless device 702 are depicted as single boxes located within a single larger box; however, in practice a wireless device may comprises multiple different physical components that make up a single illustrated component (e.g., the storage 718 may comprise multiple discrete microchips, each microchip representing a portion of the total storage capacity).

The processor 716 may be a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in combination with other wireless device 702 components, such as the storage 718, wireless device 702 functionality. Such functionality may include providing various wireless features discussed herein, including any of the features or benefits disclosed herein.

The storage 718 may be any form of volatile or non-volatile memory including, without limitation, persistent storage, solid state memory, remotely mounted memory, magnetic media, optical media, RAM, ROM, removable media, or any other suitable local or remote memory component. The storage 718 may store any suitable data, instructions, or information, including software and encoded logic, utilized by the wireless device 702. The storage 718 may be used to store any calculations made by the processor 716 and/or any data received via the interface 720.

The interface 720 may be used in the wireless communication of signaling and/or data between the wireless device 702 and the network node 704. For example, the interface 720 may perform any formatting, coding, or translating that may be needed to allow the wireless device 702 to send and receive data from the network node 704 over a wireless connection. The interface 720 may also include a radio transmitter and/or receiver that may be coupled to or a part of the antenna 722. The radio may receive digital data that is to be sent out to the network node 704 via a wireless connection. The radio may convert the digital data into a radio signal having the appropriate channel and bandwidth parameters. The radio signal may then be transmitted via the antenna 722 to the network node 704.

The antenna 722 may be any type of antenna capable of transmitting and receiving data and/or signals wirelessly. In some embodiments, the antenna 722 may comprise one or more omni-directional antennas operable to transmit/receive radio signals between 2 GHz and 66 GHz. For simplicity, the antenna 722 may be considered a part of the interface 720 to the extent that a wireless signal is being used.

Figure 8:
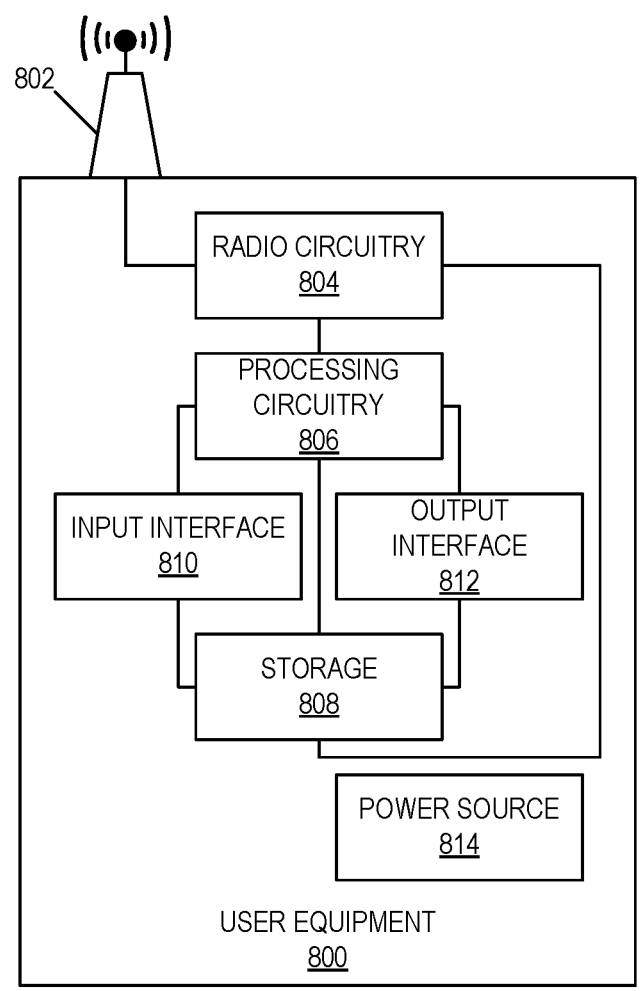
FIG. 8 illustrates one example of a wireless device in which embodiments of the present disclosure may be implemented.

As shown in FIG. 8, a UE 800 is an example wireless device. The UE 800 includes an antenna 802, radio front-end circuitry 804, processing circuitry 806, and a computer-readable storage medium 808. The antenna 802 may include one or more antennas or antenna arrays, and is configured to send and/or receive wireless signals, and is connected to the radio front-end circuitry 804. In certain alternative embodiments, the UE 800 may not include the antenna 802, and the antenna 802 may instead be separate from the UE 800 and be connectable to the UE 800 through an interface or port.

The radio front-end circuitry 804 may comprise various filters and amplifiers, is connected to antenna 802 and the processing circuitry 806, and is configured to condition signals communicated between the antenna 802 and the processing circuitry 806. In certain alternative embodiments, the UE 800 may not include the radio front-end circuitry 804, and the processing circuitry 806 may instead be connected to the antenna 802 without the radio front-end circuitry 802.

The processing circuitry 806 may include one or more of Radio Frequency (RF) transceiver circuitry, baseband processing circuitry, and application processing circuitry. In some embodiments, the RF transceiver circuitry, the baseband processing circuitry, and the application processing circuitry may be on separate chipsets. In alternative embodiments, part or all of the baseband processing circuitry and the application processing circuitry may be combined into one chipset, and the RF transceiver circuitry may be on a separate chipset. In still alternative embodiments, part or all of the RF transceiver circuitry and the baseband processing circuitry may be on the same chipset, and the application processing circuitry may be on a separate chipset. In yet other alternative embodiments, part or all of the RF transceiver circuitry, the baseband processing circuitry, and the application processing circuitry may be combined in the same chipset. The processing circuitry 806 may include, for example, one or more CPUs, one or more microprocessors, one or more ASICs, and/or one or more FPGAs.

In particular embodiments, some or all of the functionality described herein as being provided by a wireless device may be provided by the processing circuitry 806 executing instructions stored on the computer-readable storage medium 808. In alternative embodiments, some or all of the functionality may be provided by the processing circuitry 806 without executing instructions stored on a computer-readable medium, such as in a hard-wired manner. In any of those particular embodiments, whether executing instructions stored on a computer-readable storage medium or not, the processing circuitry 806 can be said to be configured to perform the described functionality. The benefits provided by such functionality are not limited to the processing circuitry 806 alone or to other components of the UE 800, but are enjoyed by the UE 800 as a whole, and/or by end users and the wireless network generally.

The antenna 802, the radio front-end circuitry 804, and/or the processing circuitry 806 may be configured to perform any receiving operations described herein as being performed by a wireless device. Any information, data and/or signals may be received from a network node and/or another wireless device.

The processing circuitry 806 may be configured to perform any determining operations described herein as being performed by a wireless device. Determining as performed by the processing circuitry 806 may include processing information obtained by the processing circuitry 806 by, for example, converting the obtained information into other information, comparing the obtained information or converted information to information stored in the UE 800, and/or performing one or more operations based on the obtained information or converted information, and as a result of said processing making a determination.

The antenna 802, the radio front-end circuitry 806, and/or the processing circuitry 806 may be configured to perform any transmitting operations described herein as being performed by a wireless device. Any information, data and/or signals may be transmitted to a network node and/or another wireless device.

The computer-readable storage medium 808 is generally operable to store instructions, such as a computer program, software, an application including one or more of logic, rules, code, tables, etc., and/or other instructions capable of being executed by a processor. Examples of the computer-readable storage medium 808 include computer memory (for example, RAM or ROM), mass storage media (for example, a hard disk), removable storage media (for example, a Compact Disk (CD) or a Digital Video Disk (DVD)), and/or any other volatile or non-volatile, non-transitory computer-readable, and/or computer-executable memory devices that store information, data, and/or instructions that may be used by the processing circuitry 806. In some embodiments, the processing circuitry 806 and the computer-readable storage medium 808 may be considered to be integrated.

Alternative embodiments of the UE 800 may include additional components beyond those shown in FIG. 8 that may be responsible for providing certain aspects of the UE's functionality, including any of the functionality described herein and/or any functionality necessary to support the solution described above. As just one example, the UE 800 may include input interfaces 810, devices, and circuits and output interfaces 812, devices, and circuits. Input interfaces 810, devices, and circuits are configured to allow input of information into the UE 800, and are connected to the processing circuitry 806 to allow the processing circuitry 806 to process the input information. For example, input interfaces 810, devices, and circuits may include a microphone, a proximity or other sensor, keys/buttons, a touch display, one or more cameras, a USB port, or other input elements. Output interfaces 812, devices, and circuits are configured to allow output of information from the UE 800, and are connected to the processing circuitry 806 to allow the processing circuitry 806 to output information from the UE 800. For example, output interfaces 812, devices, or circuits may include a speaker, a display, vibrating circuitry, a USB port, a headphone interface, or other output elements. Using one or more input and output interfaces, devices, and circuits, the UE 800 may communicate with end users and/or the wireless network and allow them to benefit from the functionality described herein.

As another example, the UE 800 may include a power source 814. The power source 814 may comprise power management circuitry. The power source 814 may receive power from a power supply, which may either be comprised in, or be external to, the power source 814. For example, the UE 800 may comprise a power supply in the form of a battery or battery pack which is connected to, or integrated in, the power source 814. Other types of power sources, such as photovoltaic devices, may also be used. As a further example, the UE 800 may be connectable to an external power supply (such as an electricity outlet) via an input circuitry or interface such as an electrical cable, whereby the external power supply supplies power to the power source 814. The power source 814 may be connected to the radio front-end circuitry 804, the processing circuitry 806, and/or the computer-readable storage medium 808 and be configured to supply the UE 800, including the processing circuitry 806, with power for performing the functionality described herein.

UE 800 may also include multiple sets of the processing circuitry 806, the computer-readable storage medium 808, the radio front-end circuitry 804, and/or the antenna 802 for different wireless technologies integrated into the UE 800, such as, for example, GSM, Wideband Code Division Multiple Access (WCDMA), LTE, NR, WiFi, or Bluetooth wireless technologies. These wireless technologies may be integrated into the same or different chipsets and other components within the UE 800.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, the storage 710 may comprise computer readable means on which a computer program can be stored. The computer program may include instructions which cause the processor 708 (and any operatively coupled entities and devices, such as the interface 712 and the storage 710) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by the processors 716 and/or 708, possibly in cooperation with the storage 718 and/or 710. The processors 716 and/or 708 and the storage 718 and/or 710 may thus be arranged to allow the processors 716 and/or 708 to fetch instructions from the storage 718 and/or 710 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
ASIC Application Specific Integrated Circuit
BSC Base Station Controller
BTS Base Transceiver Station
CD Compact Disk
CPE Customer Premise Equipment
CPU Central Processing Unit
D2D Device-to-Device
DAS Distributed Antenna System
DCI Downlink Control Information
DL-SCH Downlink Shared Channel
DSP Digital Signal Processor
DVD Digital Video Disk
eMTC Enhanced Machine Type Communication
eNB Enhanced or Evolved Node B
E-SMLC Evolved Serving Mobile Location Center
FeMTC Further Enhanced Machine Type Communication
FPGA Field Programmable Gate Array
GHz Gigahertz
gNB New Radio Base Station
GSM Global System for Mobile Communications
IoT Internet of Things
IP Internet Protocol
kHz Kilohertz
LAN Local Area Network
LEE Laptop Embedded Equipment
LME Laptop Mounted Equipment
LTE Long Term Evolution
M2M Machine-to-Machine
MAC Medium Access Control
MBMS Multimedia Broadcast Multicast Service
MBSFN Multimedia Broadcast Multicast Service Single-Frequency Network
MCCH Multicast Control Channel
MCE Multi-Cell/Multicast Coordination Entity
MCS Modulation and Coding Scheme
MDT Minimization of Drive Tests
MME Mobility Management Entity
MPDCCH Machine Type Communication Physical Downlink Control Channel
M-RNTI Multimedia Broadcast Multicast Service Radio Network Temporary Identifier
MSC Mobile Switching Center
MSR Multi-Standard Radio
MTC Machine Type Communication
NB-IoT Narrowband Internet of Things
NPDCCH Narrowband Physical Downlink Control Channel
NPDSCH Narrowband Physical Downlink Shared Channel
NR New Radio
O&M Operation and Maintenance
OSS Operations Support System
PDA Personal Digital Assistant
PDCCH Physical Downlink Control Channel
PDSCH Physical Downlink Shared Channel
PRB Physical Resource Block
PSTN Public Switched Telephone Network
RAM Random Access Memory
RAT Radio Access Technology
Rel Release RF Radio Frequency
RNC Radio Network Controller
ROM Read Only Memory
RRC Radio Resource Control
RRH Remote Radio Head
RRU Remote Radio Unit
SC-MCCH Single-Cell Multicast Control Channel
SC-MTCH Single-Cell Multicast Traffic Channel
SC-N-RNTI Single-Cell Notification Radio Network Temporary Identifier
SC-PTM Single-Cell Point-to-Multipoint
SON Self-Organizing Network
TBS Transport Block Size
TS Technical Specification
UE User Equipment
UMTS Universal Mobile Telecommunications System
USB Universal Serial Bus
VoIP Voice over Internet Protocol
WAN Wide Area Network
WCDMA Wideband Code Division Multiple Access
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method of operation of a wireless device to receive a plurality of Single-Cell Multicast Control Channel, SC-MCCH, segments, comprising:
   obtaining information regarding segmentation of a SC-MCCH into a plurality of SC-MCCH segments when a payload size of the SC-MCCH is larger than a maximum supported transport block size, TBS;
   wherein obtaining the information regarding segmentation of the SC-MCCH into the plurality of SC-MCCH segments comprises:
      receiving separate Downlink Control Information, DCI, messages scheduling the separate transmissions for the plurality of SC-MCCH segments, comprising:
         receiving a first DCI message that schedules a transmission for a first SC-MCCH segment of the plurality of SC-MCCH segments; and
         receiving a second DCI message that schedules a transmission for a second SC-MCCH segment of the plurality of SC-MCCH segments; and
   receiving, from a network node, separate transmissions for the plurality of SC-MCCH segments in accordance with the information regarding segmentation of the SC-MCCH, comprising:
      receiving the transmission for the first SC-MCCH segment in accordance with the first DCI message; and
      receiving the transmission for the second SC-MCCH segment in accordance with the second DCI message.

2. The method of claim 1 wherein, for each SC-MCCH segment, the separate DCI message scheduling the separate transmission for the SC-MCCH segment comprises an indication of a Modulation and Coding Scheme, MCS, and repetition number for the separate transmission for the SC-MCCH segment.

3. The method of claim 1 wherein, for each SC-MCCH segment, the separate DCI message scheduling the separate transmission for the SC-MCCH segment comprises an indication as to whether there is a subsequent SC-MCCH segment scheduled and at what time interval a next SC-MCCH segment is scheduled.

4. The method of claim 1 wherein configuration of the separate DCI messages scheduling the separate transmissions for the plurality of SC-MCCH segments is configured in system information.

5. The method of claim 1 wherein configuration of the separate DCI messages scheduling the separate transmissions for the plurality of SC-MCCH segments is derived by the wireless device.

6. The method of claim 1 wherein two or more types of DCI messages are configured, wherein the two or more types of DCI messages comprise a first type of DCI message for non-segmented SC-MCCH scheduling and a second type of DCI message for segmented SC-MCCH scheduling, wherein the separate DCI messages scheduling the separate transmissions for the plurality of SC-MCCH segments are of the second type.

7. The method of claim 1 wherein a combined size of the plurality of SC-MCCH segments is greater than a maximum Transport Block Size, TBS, for the wireless device.

8. The method of claim 1 wherein the wireless device is an enhanced Machine Type Communication, eMTC/further enhanced Machine Type Communication, FeMTC, User Equipment, UE, or a Narrowband Internet of Things, NB-IoT, UE.

9. A wireless device for receiving a plurality of Single-Cell Multicast Control Channel, SC-MCCH, segments, the wireless device comprising:
   an interface configured to transmit to and receive from a network node in a wireless communication system;
   a processor operable to:
      obtain information regarding segmentation of a SC-MCCH into a plurality of SC-MCCH segments when a payload size of the SC-MCCH is larger than a maximum supported transport block size, TBS;
      wherein the processor is operable to obtain the information regarding segmentation of the SC-MCCH into the plurality of SC-MCCH segments $1_{21}$ receiving separate Downlink Control Information, DCI, messages scheduling the separate transmissions for the plurality of SC-MCCH segments, comprising:
         receiving a first DCI message that schedules a transmission for a first SC-MCCH segment of the plurality of SC-MCCH segments; and
         receiving a second DCI message that schedules a transmission for a second SC-MCCH segment of the plurality of SC-MCCH segments; and
      receive, from a network node, separate transmissions for the plurality of SC-MCCH segments in accordance with the information regarding segmentation of the SC-MCCH, by:
         receiving the transmission for the first SC-MCCH segment in accordance with the first DCI message; and
         receiving the transmission for the second SC-MCCH segment in accordance with the second DCI message.

10. A method of operation of a network node to schedule and transmit a plurality of Single-Cell Multicast Control Channel, SC-MCCH, segments, comprising:
   providing, to one or more wireless devices, information regarding segmentation of a SC-MCCH into a plurality of SC-MCCH segments when a payload size of the SC-MCCH is larger than a maximum supported transport block size, TBS;

wherein providing the information regarding segmentation of the SC-MCCH into the plurality of SC-MCCH segments comprises:
    providing separate Downlink Control Information, DCI, messages scheduling the separate transmissions for the plurality of SC-MCCH segments, comprising:
        providing a first DCI message that schedules a transmission for a first SC-MCCH segment of the plurality of SC-MCCH segments; and
        providing a second DCI message that schedules a transmission for a second SC-MCCH segment of the plurality of SC-MCCH segments; and
    transmitting, to the one or more wireless devices, separate transmissions for the plurality of SC-MCCH segments in accordance with the information regarding segmentation of the SC-MCCH, comprising:
        transmitting the transmission for the first SC-MCCH segment in accordance with the first DCI message; and
        transmitting the transmission for the second SC-MCCH segment in accordance with the second DCI message.

11. The method of claim 10 wherein, for each SC-MCCH segment, the separate DCI message scheduling the separate transmission for the SC-MCCH segment comprises an indication of a Modulation and Coding Scheme, MCS, and repetition number for the separate transmission for the SC-MCCH segment.

12. The method of claim 10 wherein, for each SC-MCCH segment, the separate DCI message scheduling the separate transmission for the SC-MCCH segment comprises an indication as to whether there is a subsequent SC-MCCH segment scheduled and at what time interval a next SC-MCCH segment is scheduled.

13. The method of claim 10 wherein configuration of the separate DCI messages scheduling the separate transmissions for the plurality of SC-MCCH segments is configured in system information.

14. The method of claim 10 wherein configuration of the separate DCI messages scheduling the separate transmissions for the plurality of SC-MCCH segments is derived by the one or more wireless devices.

15. The method of claim 10 wherein two or more types of DCI messages are configured, wherein the two or more types of DCI messages comprise a first type of DCI message for non-segmented SC-MCCH scheduling and a second type of DCI message for segmented SC-MCCH scheduling, wherein the separate DCI messages scheduling the separate transmissions for the plurality of SC-MCCH segments are of the second type.

16. The method of claim 10 wherein a combined size of the plurality of SC-MCCH segments is greater than a maximum Transport Block Size, TBS, for the one or more wireless devices.

17. The method of claim 10 wherein the one or more wireless devices comprise an enhanced Machine Type Communication, eMTC/further enhanced Machine Type Communication, FeMTC, User Equipment, UE, and/or a Narrowband Internet of Things, NB-IoT, UE.

18. A network node for scheduling and transmitting a plurality of Single-Cell Multicast Control Channel, SC-MCCH, segments, the network node comprising:
    an interface configured to transmit to and receive from one or more wireless devices in a wireless communication system;
    a processor operable to:
        provide, to the one or more wireless devices, information regarding segmentation of a SC-MCCH into a plurality of SC-MCCH segments when a payload size of the SC-MCCH is larger than a maximum supported transport block size, TBS;
    wherein the processor is operable to provide the information regarding segmentation of the SC-MCCH into the plurality of SC-MCCH segments by:
        providing separate Downlink Control Information, DCI, messages scheduling the separate transmissions for the plurality of SC-MCCH segments, comprising:
            providing a first DCI message that schedules a transmission for a first SC-MCCH segment of the plurality of SC-MCCH segments; and
            providing a second DCI message that schedules a transmission for a second SC-MCCH segment of the plurality of SC-MCCH segments; and
        transmit, to the one or more wireless devices via the interface, separate transmissions for the plurality of SC-MCCH segments in accordance with the information regarding segmentation of the SC-MCCH, by:
            transmitting the transmission for the first SC-MCCH segment in accordance with the first DCI message; and
            transmitting the transmission for the second SC-MCCH segment in accordance with the second DCI message.

* * * * *

UNITED STATES PATENT AND TRADEMARK OFFICE
CERTIFICATE OF CORRECTION

| | | |
|---|---|---|
| PATENT NO. | : 11,765,554 B2 | Page 1 of 1 |
| APPLICATION NO. | : 16/477822 | |
| DATED | : September 19, 2023 | |
| INVENTOR(S) | : Yavuz et al. | |

It is certified that error appears in the above-identified patent and that said Letters Patent is hereby corrected as shown below:

On the Title Page

On Page 2, in Item (56), under "OTHER PUBLICATIONS", in Column 2, Line 19, delete "#84:" and insert -- #84; --, therefor.

In the Claims

In Column 24, Line 40, in Claim 9, delete "$1_{21}$" and insert -- by --, therefor.

Signed and Sealed this
Twenty-third Day of January, 2024

Katherine Kelly Vidal
*Director of the United States Patent and Trademark Office*